(12) United States Patent
Ahn et al.

(10) Patent No.: US 9,246,153 B2
(45) Date of Patent: Jan. 26, 2016

(54) SECONDARY BATTERY

(71) Applicant: Samsung SDI Co., Ltd., Yongin-si, Gyeonggi-do (KR)

(72) Inventors: Byungkook Ahn, Yongin-si (KR); Daeyon Moon, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/478,645

(22) Filed: Sep. 5, 2014

(65) Prior Publication Data

US 2015/0380715 A1 Dec. 31, 2015

(30) Foreign Application Priority Data

Jun. 30, 2014 (KR) ........................ 10-2014-0080458

(51) Int. Cl.
*H01M 2/02* (2006.01)
*H01M 2/24* (2006.01)
*H01M 2/30* (2006.01)
*H01M 10/0525* (2010.01)

(52) U.S. Cl.
CPC *H01M 2/24* (2013.01); *H01M 2/30* (2013.01); *H01M 10/0525* (2013.01); *H01M 2220/30* (2013.01)

(58) Field of Classification Search
None
See application file for complete search history.

(56) References Cited

U.S. PATENT DOCUMENTS

| 6,117,586 A * | 9/2000 | Kim et al. ..................... 429/175 |
| 2006/0057456 A1* | 3/2006 | Hong et al. ................... 429/129 |
| 2007/0207377 A1* | 9/2007 | Han et al. ..................... 429/162 |
| 2009/0087692 A1* | 4/2009 | Park et al. ......................... 429/7 |
| 2009/0123834 A1* | 5/2009 | Byun ............................ 429/178 |
| 2009/0246620 A1 | 10/2009 | Lee et al. |
| 2010/0143788 A1* | 6/2010 | Koh et al. ..................... 429/163 |
| 2010/0216015 A1* | 8/2010 | Kamada et al. ............... 429/178 |
| 2011/0052976 A1 | 3/2011 | Ishii et al. |
| 2011/0076520 A1 | 3/2011 | Lee et al. |

(Continued)

FOREIGN PATENT DOCUMENTS

| JP | 2009-146680 A | 7/2009 |
| JP | 2009-170137 A | 7/2009 |

(Continued)

OTHER PUBLICATIONS

Korean Notice of Allowance dated Dec. 5, 2014 for Korean Patent Application No. KR 10-2014-0080458 which corresponds to captioned U.S. Appl. No. 14/478,645.

(Continued)

*Primary Examiner* — Patrick Ryan
*Assistant Examiner* — Jose Colucci Rios
(74) *Attorney, Agent, or Firm* — Knobbe, Martens, Olson & Bear, LLP

(57) ABSTRACT

A secondary battery is disclosed. In one aspect, the battery includes a bare cell having a substantially prismatic shape, a first terminal located in a first region of a first surface of the bare cell and a second terminal located in a second region of the first surface of the bare cell. The battery also includes a first insulation tape located between the bare cell and the first terminal, wherein the first insulation tape covers the first surface of the bare cell, and second and third surfaces of the bare cell extending in a direction that crosses the first surface of the bare cell. The battery also includes a second insulation tape located between the first insulation tape and the first terminal.

21 Claims, 3 Drawing Sheets

(56) References Cited

U.S. PATENT DOCUMENTS

| | | |
|---|---|---|
| 2012/0121942 A1 | 5/2012 | Kim |
| 2013/0108900 A1 | 5/2013 | Lee et al. |
| 2013/0196218 A1* | 8/2013 | Masuda ............ 429/179 |
| 2014/0212740 A1* | 7/2014 | Munenaga et al. ........ 429/178 |

FOREIGN PATENT DOCUMENTS

| | | |
|---|---|---|
| JP | 2011-49066 A | 3/2011 |
| KR | 10-0592026 B1 | 6/2006 |
| KR | 10-2009-0103404 A | 10/2009 |
| KR | 10-2011-0034853 A | 4/2011 |
| KR | 10-2013-0065686 A | 6/2013 |

OTHER PUBLICATIONS

Extended European Search Report dated Oct. 12, 2015 for European Patent Application No. EP 14 186 896.8 which shares priority of Korean Patent Application No. KR 10-2014-0080458 with captioned U.S. Appl. No. 14/478,645, and cites the above-identified references numbered 1-2.

* cited by examiner

SECONDARY BATTERY

INCORPORATION BY REFERENCE TO ANY PRIORITY APPLICATIONS

This application claims the benefit of Korean Patent Application No. 10-2014-0080458, filed on Jun. 30, 2014, in the Korean Intellectual Property Office, the disclosure of which is incorporated herein in its entirety by reference.

BACKGROUND

1. Field

The described technology generally relates to a secondary battery.

2. Description of the Related Technology

Along with the development of wireless Internet and communication technology, the use of electronic devices such as cellular phones or portable computers equipped with batteries has become widespread. Electronic devices each equipped with one or more secondary (rechargeable) batteries may be used anywhere without being limited to places where power outlets are available.

SUMMARY OF CERTAIN INVENTIVE ASPECTS

One inventive aspect is a secondary battery.

Another aspect is a secondary battery which includes: a bare cell having a prismatic shape; a first terminal located in a first region of a first surface of the bare cell; a second terminal located in a second region of the first surface of the bare cell; a first insulation tape located between the bare cell and the first terminal, the first insulation tape covering the first surface of the bare cell and second and third surfaces of the bare cell perpendicular to the first surface of the bare cell; and a second insulation tape located between the first insulation tape and the first terminal.

The first insulation tape may have an area greater than that of the second insulation tape.

The second insulation tape may be thicker than the first insulation tape.

The first insulation tape may include: a first portion covering a portion of the first surface of the bare cell; a second portion substantially perpendicular to the first portion and covering a portion of the second surface of the bare cell; and a third portion substantially perpendicular to the first portion and covering a portion of the third surface of the bare cell.

The second insulation tape may be located to correspond to only the first region of the bare cell.

The first surface of the bare cell may include an electrode pin protruding therefrom, wherein the electrode pin may have a first polarity and the first surface of the bare cell may have a second polarity opposite to the first polarity.

The first region and the second region may be opposite with respect to the electrode pin.

At least one selected from a surface of the second insulation tape facing the first insulation tape and another surface of the second insulation tape facing the first terminal may be adhesive.

The first terminal may include: a first electrode tab connected to an electrode pin located on the first surface of the bare cell; a second electrode tab separate from the first electrode tab in a length direction of the first surface of the bare cell; and a temperature device located between the first and second electrode tabs and connected to the first and second electrode tabs.

The secondary battery may further include a fixing member covering the first terminal and fixing the first terminal to the bare cell.

Another aspect is a secondary battery which includes: a bare cell including a can including an opening and formed of a metallic material, an electrode assembly located in the can, a cap plate sealing the opening of the can, and an electrode pin protruding outward from the cap plate; a first terminal located in a first region of the cap plate and connected to the electrode pin; a second terminal located in a second region of the cap plate and connected to the cap plate; a first insulation tape located between the first terminal and the cap plate, the first insulation tape covering the first region of the cap plate and upper and lower surfaces of the bare cell substantially perpendicular to the cap plate; and a second insulation tape located between the first insulation tape and the first terminal.

The second insulation tape may be thicker than the first insulation tape.

The second insulation tape may be located only in the second region of the cap plate.

The first insulation tape may have an area greater than that of the second insulation tape.

The first insulation tape may include: a first portion covering the first region of the cap plate; a second portion substantially perpendicular to the first portion and covering a portion of the upper surface of the bare cell; and a third portion substantially perpendicular to the first portion and covering a portion of the lower surface of the bare cell.

The first and second regions of the cap plate may be opposite with respect to the electrode pin.

At least one selected from a surface of the second insulation tape facing the first insulation tape and a surface of the second insulation tape facing the first terminal may be adhesive.

The first terminal may include: a first electrode tab connected to the electrode pin; a second electrode tab separate from the first electrode tab in a length direction of the cap plate; and a temperature device located between the first and second electrode tabs and connected to the first and second electrode tabs.

The secondary battery may further include a fixing member covering the first terminal and preventing separation of the first terminal from the bare cell. The fixing member may be an adhesive tape.

Another aspect is a secondary battery comprising: a bare cell having a substantially prismatic shape; a first terminal located in a first region of a first surface of the bare cell; a second terminal located in a second region of the first surface of the bare cell; a first insulation tape located between the bare cell and the first terminal, wherein the first insulation tape covers the first surface of the bare cell, and second and third surfaces of the bare cell extending in a direction that crosses the first surface of the bare cell; and a second insulation tape located between the first insulation tape and the first terminal.

In the above battery, the first insulation tape is greater in area than the second insulation tape. In the above battery, the second insulation tape is thicker than the first insulation tape. In the above battery, the first insulation tape comprises: a first portion covering a portion of the first surface of the bare cell; a second portion covering a portion of the second surface of the bare cell; and a third portion covering a portion of the third surface of the bare cell, wherein the first and second portions extend in a direction crossing the first portion. In the above battery, the second insulation tape is located to correspond to only the first region of the bare cell. The above battery further comprises an electrode pin extending outwardly from the first surface of the bare cell, wherein the electrode pin has a first polarity, and wherein the first surface of the bare cell has a second polarity opposite to the first polarity.

In the above battery, the first and second regions are opposite with respect to the electrode pin. In the above battery, the second insulation tape comprises two surfaces respectively facing the first insulation tape and the first terminal, and wherein at least one of the two surfaces is adhesive. In the above battery, the first terminal comprises: a first electrode tab connected to an electrode pin located on the first surface of the bare cell; a second electrode tab separate from the first electrode tab in a length direction of the first surface of the bare cell; and a temperature device located between the first and second electrode tabs and connected to the first and second electrode tabs. The above battery further comprises a fixing member covering the first terminal and fixing the first terminal to the bare cell.

Another aspect is a secondary battery comprising: a bare cell including i) a can, ii) an electrode assembly accommodated in the can, iii) a cap plate substantially sealing the electrode assembly in the can, and iv) an electrode pin outwardly extending from the cap plate; a first terminal located in a first region of the cap plate and connected to the electrode pin; a second terminal located in a second region of the cap plate and connected to the cap plate; a first insulation tape located between the first terminal and the cap plate, wherein the first insulation tape covers the first region of the cap plate, and upper and lower surfaces of the bare cell extending in a direction that crosses the cap plate; and a second insulation tape located between the first insulation tape and the first terminal.

In the battery, the second insulation tape is thicker than the first insulation tape. In the above battery, the second insulation tape is located only in the second region of the cap plate. In the above battery, the first insulation tape is greater in area than the second insulation tape. In the above battery, the first insulation tape comprises: a first portion covering the first region of the cap plate; a second portion covering a portion of the upper surface of the bare cell; and a third portion covering a portion of the lower surface of the bare cell, wherein the first and second portions extend in a direction crossing the first portion. In the above battery, the first and second regions of the cap plate are opposite with respect to the electrode pin.

In the above battery, the second insulation tape comprises two surfaces respectively facing the first insulation tape and the first terminal, and wherein at least one of the two surfaces is adhesive. In the above battery, the first terminal comprises: a first electrode tab connected to the electrode pin; a second electrode tab separate from the first electrode tab in a length direction of the cap plate; and a temperature device located between the first and second electrode tabs and connected to the first and second electrode tabs. The above battery further comprises a fixing member covering the first terminal and preventing separation of the first terminal from the bare cell. In the above battery, the fixing member comprises an adhesive tape.

DETAILED DESCRIPTION OF CERTAIN INVENTIVE EMBODIMENTS

Figure 1:
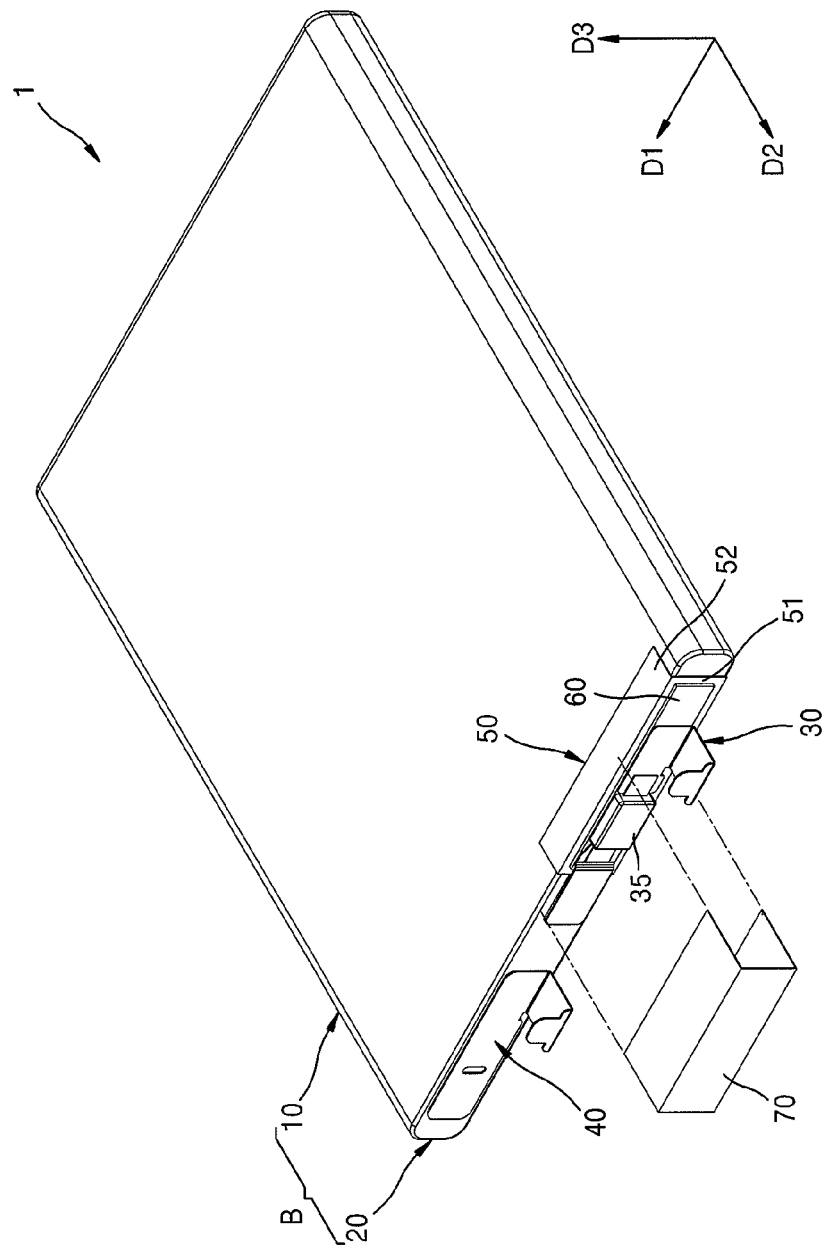
FIG. 1 is a schematic perspective view illustrating a secondary battery according to an embodiment.

Reference will now be made in detail to embodiments, examples of which are illustrated in the accompanying drawings. Effects and features of the embodiments, and implementation methods thereof will be clarified through the following descriptions given with reference to the accompanying drawings. In this regard, the embodiments may have different forms and should not be construed as being limited to the descriptions set forth herein. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments will be described in detail with reference to the accompanying drawings. In the drawings, like reference numerals denote like elements, and overlapping descriptions thereof will be omitted.

In the following descriptions of the embodiments, although the terms "first and second" are used to describe various elements, these elements should not be limited by these terms. These terms are only used to distinguish one element from another element.

In the following descriptions of the embodiments, the terms of a singular form may include plural forms unless referred to the contrary.

In this disclosure, the term "substantially" includes the meanings of completely, almost completely or to any significant degree under some applications and in accordance with those skilled in the art. Moreover, "formed on" can also mean "formed over." The term "connected" includes an electrical connection.

It will be understood that when a film, a region, or an element is referred to as being "above" or "on" another film, region, or element, it can be directly on the other film, region, or element, or intervening films, regions, or elements may also be present.

In the drawings, the sizes of elements may be exaggerated for clarity. For example, in the drawings, the size or thickness of each element may be arbitrarily shown for illustrative purposes, and thus the present invention should not be construed as being limited thereto.

Figure 2:
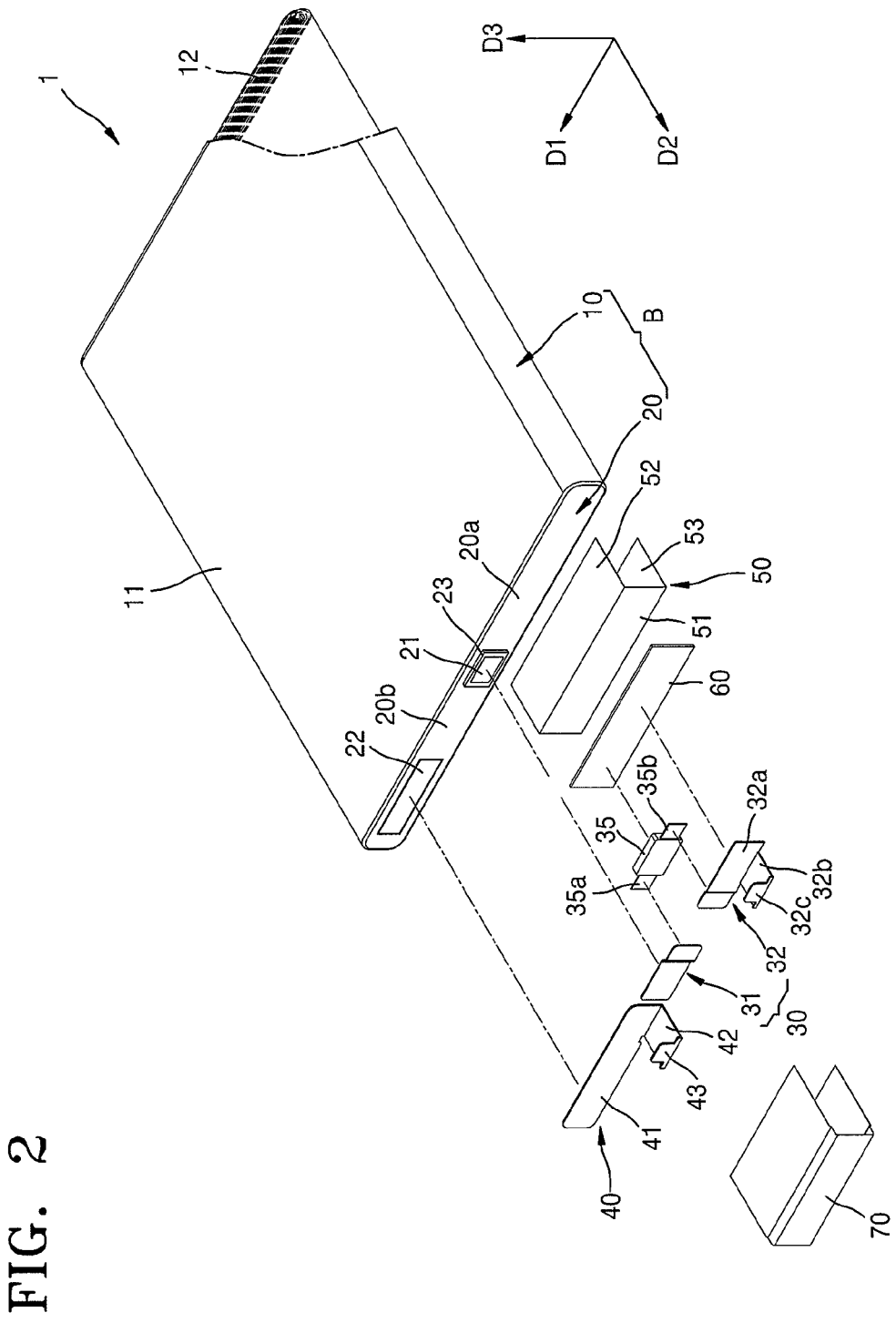
FIG. 2 is an exploded perspective view illustrating the secondary battery illustrated in FIG. 1.

Referring to FIGS. 1 and 2, the secondary battery includes a bare cell B, a first terminal 30, a second terminal 40, a first insulation tape 50, a second insulation tape 60, and a fixing member 70. In FIG. 2, to help understanding of embodiments, a can 10 is partially cut away to show an electrode assembly 12.

The bare cell B may be a secondary battery cell such as a rechargeable lithium-ion battery cell. The bare cell B may have a substantially hexahedral prism shape. The bare cell B may include the can 10 having an opening, the electrode assembly 12 inserted into the can 10 through the opening, a cap plate 20 closing the opening of the can 10, and an electrode pin 21 formed on the cap plate 20.

The can 10 may have a hexahedral shape with an opened side and may be formed of a metallic material so that the can 10 may have suitable resistance. For example, the can 10 may be formed of aluminum or an aluminum alloy. After the electrode assembly 12 is inserted into the can 10, the opening of the can 10 may be substantially hermetically closed by the cap plate 20. Like the can 10, the cap plate 20 may be formed of a metallic material such as aluminum or an aluminum alloy.

Boundaries between the cap plate 20 and the can 10 may be welded together using a laser for sealing the inside of the can 10.

The electrode assembly 12 may include first and second electrode plates coated with electrode active materials, and a separator located between the first and second electrode plates. The first and second electrode plates have different polarities. The electrode assembly 12 may be formed by sequentially stacking the first electrode plate, the separator, and the second electrode plate, and winding them in the form of a jelly roll.

In the current embodiment, the electrode assembly 12 has a jelly roll shape. However, the disclosed embodiments are not limited thereto. For example, a stack in which a first electrode plate, a separator, and a second electrode plate are sequentially stacked may be used as the electrode assembly 12.

The electrode pin 21 may be formed on the cap plate 20. The electrode pin 21 may protrude from the cap plate 20.

The first electrode plate may be electrically connected to the electrode pin 21, and the second electrode plate may be electrically connected to the cap plate 20. Since the first and second electrode plates have different polarities, the electrode pin 21 and the cap plate 20 have different polarities. For example, the electrode pin 21 has a negative polarity, and the cap plate 20 has a positive polarity. A gasket 23 may be located between the electrode pin 21 and the cap plate 20 so as to prevent a short circuit therebetween.

Figure 3:
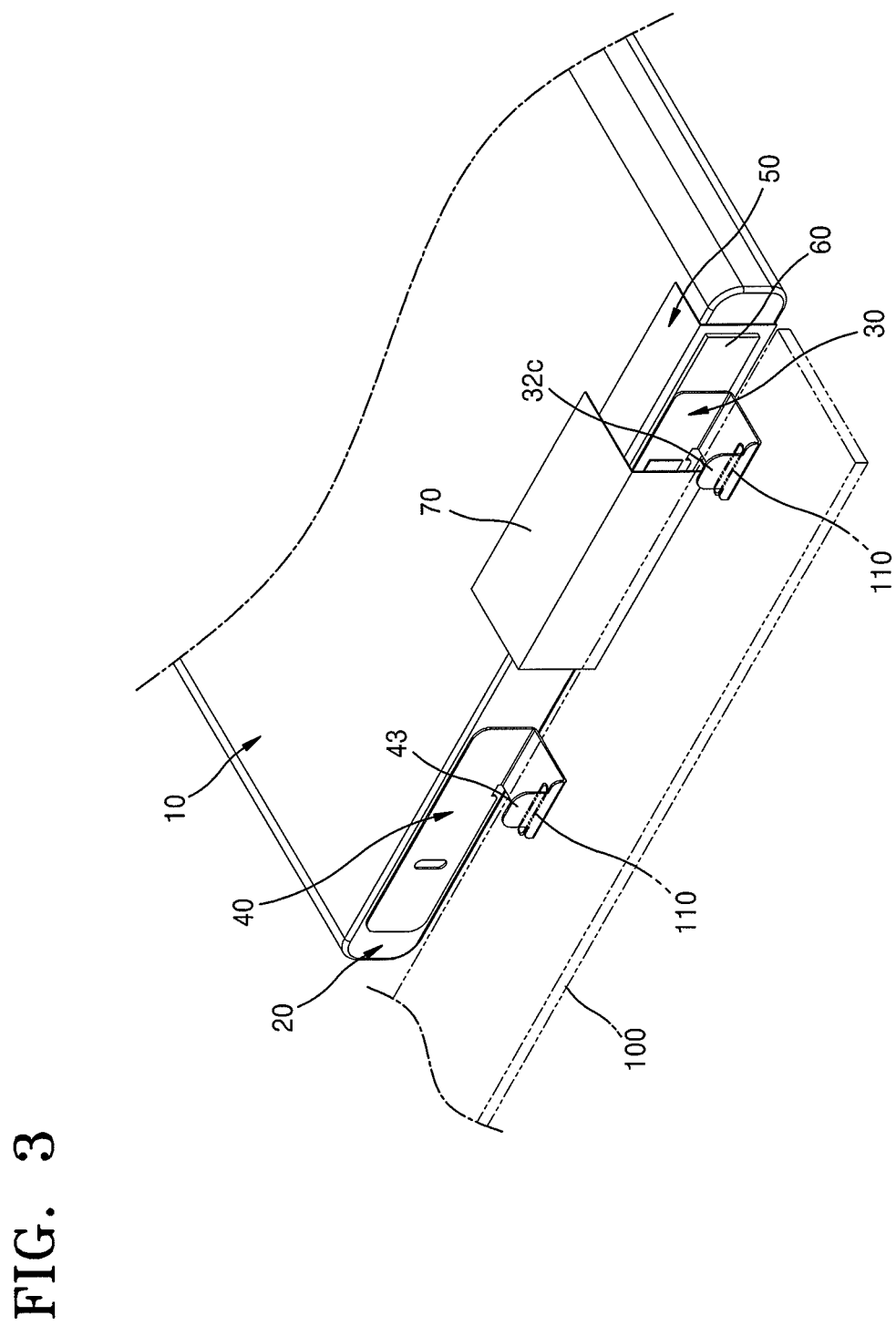
FIG. 3 is a view illustrating how a protective circuit module is coupled to the secondary battery according to the embodiment.

The first and second terminals 30 and 40 may be located on a first surface of the bare cell B (for example, the first terminal 30 and the second terminal 40 may be located on the cap plate 20), and may be electrically connected to the protective circuit module. For example, as shown in FIG. 3, an end 32c (third surface 32c) of the first terminal 30 and an end 43 (third surface 43) of the second terminal 40 may be inserted into holes 110 of a circuit board 100 of the protective circuit module and welded thereto, so as to electrically connect the secondary battery to the protective circuit module.

Referring to back to FIGS. 1 and 2, the first terminal 30 may be located in a region (first region 20a) of the cap plate 20, and the second terminal 40 may be located in another region (second region 20b) of the cap plate 20. In the current embodiment, the first terminal 30 and the second terminal 40 are located at opposite positions with respect to the electrode pin 21.

The first terminal 30 may be located on the cap plate 20 and electrically connected to the electrode pin 21, and the second terminal 40 may be electrically connected to the cap plate 20 by bringing the second terminal 40 into contact with the second region 20b of the cap plate 20 and welding the second terminal 40 to the second region 20b.

The first terminal 30 may include a first electrode tab 31 connected to the electrode pin 21, a second electrode tab 32 separate from the first electrode tab 31 in a length direction of the cap plate 20, and a temperature device 35 located between the first and second electrode tabs 31 and 32. Both ends 35a and 35b of the temperature device 35 may be respectively directly welded to the first electrode tab 31 and the second electrode tab 32, respectively. The second electrode tab 32 may include a first surface 32a substantially parallel to the cap plate 20, a second surface 32b bent from the first surface 32a, and a third surface 32c bent from the second surface 32b and substantially parallel to the first surface 32a.

The second terminal 40 may include a first surface 41 substantially parallel to the cap plate 20, a second surface 42 bent from the first surface 41, and a third surface 43 bent from the second surface 42 and substantially parallel to the first surface 41.

The second terminal 40 and the cap plate 20 may be formed of different materials. For example, the cap plate 20 may be formed of aluminum or an aluminum alloy, and the second terminal 40 may be formed of nickel. A coupling piece 22 may be further located on the cap plate 20 for improving weldability between the second terminal 40 and the cap plate 20 formed of different materials. The coupling piece 22 may be formed of a material different from that used to form the cap plate 20. For example, the coupling piece 22 may be formed of the same material as that used to form the second terminal 40.

Since the first terminal 30 is electrically connected to the electrode pin 21 and the second terminal 40 is electrically connected to the cap plate 20, the first and second terminals 30 and 40 have different polarities. For example, the first terminal 30 has a negative polarity, and the second terminal 40 has a positive polarity.

The second terminal 40 located on the cap plate 20 has the same polarity as that of the cap plate 20, and thus a short circuit is not formed between the cap plate 20 and the second terminal 40. However, the first terminal 30 located on the cap plate 20 has a polarity different from that of the cap plate 20, and thus a short circuit may be formed between the first terminal 30 and the cap plate 20. To prevent a short circuit between the first terminal 30 and the cap plate 20, the first insulation tape 50 and the second insulation tape 60 may be between the first terminal 30 and the cap plate 20.

The first insulation tape 50 may be attached to outer surfaces of the bare cell B to prevent a short circuit between the first terminal 30 and the outer surfaces of the bare cell B.

As described above, the cap plate 20 may be coupled to the can 10 by welding. Like the cap plate 20, the can 10 is formed of a conductive metal, and thus the can 10 and the cap plate 20 may have the same polarity.

Since the outer surfaces of the bare cell B except for the electrode pin 21 have a polarity different from that of the first terminal 30, the first insulation tape 50 may be formed to be larger than the second insulation tape 60 so as to prevent a short circuit between the first terminal 30 and the cap plate 20 and a short circuit between the first terminal 30 and outer surfaces of the can 10.

The first insulation tape 50 may cover portions of three outer surfaces of the bare cell B. For example, the first insulation tape 50 includes i) a first portion 51 covering the first region 20a of the cap plate 20 which is a first surface of the bare cell B, ii) a second portion 52 substantially perpendicular to the first portion 51 and covering a portion of an upper surface 11 which is a second surface of the bare cell B iii) and a third portion 53 substantially perpendicular to the first portion 51 and covering a portion of a lower surface which is a third surface of the bare cell B. Surfaces of the first insulation tape 50 facing the bare cell B may be adhesive so as to adhere to the outer surfaces of the bare cell B.

The first insulation tape 50 may be thinner than the second insulation tape 60. The first insulation tape 50 may have a thin thickness so as not to increase the thickness of the secondary battery. The first insulation tape 50 may be formed of a thin polyethylene terephthalate (PET) film.

The second insulation tape 60 may be located between the first insulation tape 50 and the first terminal 30. The second insulation tape 60 may include an adhesive material on at least one surface selected from a surface facing the first insulation tape 50 and a surface facing the first terminal 30. In some embodiments, the second insulation tape 60 is a singlesided adhesive tape having an adhesive on a surface facing the first insulation tape 50. In other embodiments, the second insulation tape 60 is a double-sided adhesive tape having an adhesive on a surface facing the first insulation tape 50 and a surface facing the first terminal 30.

The second insulation tape 60 may be thicker than the first insulation tape 50. As described above, if the first insulation tape 50 is thin, the thickness of the secondary battery may be reduced. In this case, however, a portion of the first insulation tape 50 such as the first portion 51 located on the cap plate 20 may easily be torn by the first terminal 30. If a portion of the first insulation tape 50 is torn, the first terminal 30 may be short-circuited with an outer surface of the bare cell B through the torn portion of the first insulation tape 50.

However, according to some embodiments, since the second insulation tape 60 having a relatively thick thickness is located between the first terminal 30 and the first insulation tape 50, the first insulation tape 50 may not be easily torn.

The second insulation tape 60 may be located on only the second region 20b of the cap plate 20. Therefore, a short circuit between the first terminal 30 and the outer surface of the bare cell B may be effectively prevented by the second insulation tape 60 without increasing the thickness of the secondary battery.

The fixing member 70 may cover the first terminal 30 to prevent separation or cutting-away of the first terminal 30 from the bare cell B.

As described above, the first terminal 30 may be coupled to the bare cell B by directly welding the first electrode tab 31 to the electrode pin 21. Since only a portion of the first terminal 30 (that is, only the first electrode tab 31) is welded, the other portion of the first terminal 30 (that is, the second electrode tab 32) may not be fixed. In this case, the first terminal 30 may be separated or cut away from the bare cell B, or due to wobbling of the first terminal 30, the first terminal 30 may be short-circuited with the outer surface of the bare cell B.

However, according to some embodiments, since the fixing member 70 covers the first terminal 30, such situations may be prevented. The fixing member 70 may have a shape similar to that of the first insulation tape 50. For example, the fixing member 70 includes a portion covering the first terminal 30, and both end portions bent from the portion at right angles. The fixing member 70 may be a plastic member formed by an injection molding method or an adhesive tape. If the fixing member 70 is an adhesive tape, the thickness of the secondary battery may be reduced.

As described above, according to at least one of the disclosed embodiments, the secondary battery can be made thin, and the possibility of short circuit in the secondary battery is significantly reduced.

In addition, owing to the first and second insulation tapes, manufacturing costs of the secondary battery are substantially reduced.

It should be understood that the exemplary embodiments described herein should be considered in a descriptive sense only and not for purposes of limitation. Descriptions of features or aspects within each embodiment should typically be considered as available for other similar features or aspects in other embodiments.

While the inventive technology has been described with reference to the figures, it will be understood by those of ordinary skill in the art that various changes in form and details may be made therein without departing from the spirit and scope of the present invention as defined by the following claims.

What is claimed is:

1. A secondary battery comprising:
   a bare cell having a substantially prismatic shape;
   a first terminal located in a first region of a first surface of the bare cell;
   a second terminal located in a second region of the first surface of the bare cell;
   a first insulation tape located between the bare cell and the first terminal, wherein the first insulation tape covers the first surface of the bare cell, and second and third surfaces of the bare cell extending in a direction that crosses the first surface of the bare cell; and
   a second insulation tape located between the first insulation tape and the first terminal,
   wherein the first insulation tape comprises a first portion covering a portion of the first surface of the bare cell, and wherein the second insulating tape is directly over the first insulating tape,
   wherein the first insulation tape covers the portion of the first surface of the bare cell, at least a portion of a second surface of the bare cell and at least a portion of a third surface of the bare cell, wherein the portion of the first surface corresponds to the first region, wherein the first surface is substantially perpendicular to the second and third surfaces, and wherein the first insulation tape does not cover the second terminal.

2. The secondary battery of claim 1, wherein the first insulation tape is greater in area than the second insulation tape.

3. The secondary battery of claim 1, wherein the second insulation tape is thicker than the first insulation tape.

4. The secondary battery of claim 1, wherein the first insulation tape further comprises:
   a second portion covering a portion of the second surface of the bare cell; and
   a third portion covering a portion of the third surface of the bare cell,
   wherein the first and second portions extend in a direction crossing the first portion.

5. The secondary battery of claim 1, wherein the second insulation tape is located to correspond to only the first region of the bare cell.

6. The secondary battery of claim 1, further comprising an electrode pin extending outwardly from the first surface of the bare cell, wherein the electrode pin has a first polarity, and wherein the first surface of the bare cell has a second polarity opposite to the first polarity.

7. The secondary battery of claim 6, wherein the first and second regions are opposite with respect to the electrode pin.

8. The secondary battery of claim 1, wherein the second insulation tape comprises two surfaces respectively facing the first insulation tape and the first terminal, and wherein at least one of the two surfaces is adhesive.

9. The secondary battery of claim 1, wherein the first terminal comprises:
   a first electrode tab connected to an electrode pin located on the first surface of the bare cell;
   a second electrode tab separate from the first electrode tab in a length direction of the first surface of the bare cell; and
   a temperature device located between the first and second electrode tabs and connected to the first and second electrode tabs.

10. The secondary battery of claim 1, further comprising a fixing member covering the first terminal and fixing the first terminal to the bare cell.

11. A secondary battery comprising:
   a bare cell including i) a can, ii) an electrode assembly accommodated in the can, iii) a cap plate substantially sealing the electrode assembly in the can, and iv) an electrode pin outwardly extending from the cap plate;
a first terminal located in a first region of the cap plate and connected to the electrode pin;
a second terminal located in a second region of the cap plate and connected to the cap plate;
a first insulation tape located between the first terminal and the cap plate, wherein the first insulation tape covers the first region of the cap plate; and
a second insulation tape located between the first insulation tape and the first terminal,
wherein the first insulation tape covers a portion of a first surface of the bare cell, at least a portion of a second surface of the bare cell and at least a portion of a third surface of the bare cell, wherein the portion of the first surface corresponds to the first region, wherein the first surface is substantially perpendicular to the second and third surfaces, and wherein the first insulation tape does not cover the second terminal.

12. The secondary battery of claim 11, wherein the second insulation tape is thicker than the first insulation tape.

13. The secondary battery of claim 11, wherein the second insulation tape is located only in the first region of the cap plate.

14. The secondary battery of claim 11, wherein the first insulation tape is greater in area than the second insulation tape.

15. The secondary battery of claim 11, wherein the first and second regions of the cap plate are opposite with respect to the electrode pin.

16. The secondary battery of claim 11, wherein the second insulation tape comprises two surfaces respectively facing the first insulation tape and the first terminal, and wherein at least one of the two surfaces is adhesive.

17. The secondary battery of claim 11, wherein the first terminal comprises:
a first electrode tab connected to the electrode pin;
a second electrode tab separate from the first electrode tab in a length direction of the cap plate; and
a temperature device located between the first and second electrode tabs and connected to the first and second electrode tabs.

18. The secondary battery of claim 11, further comprising a fixing member covering the first terminal and preventing separation of the first terminal from the bare cell.

19. The secondary battery of claim 18, wherein the fixing member comprises an adhesive tape.

20. The secondary battery of claim 1, wherein the second insulation tape is formed on a single plane.

21. The secondary battery of claim 1, wherein the first insulation tape does not cover the first terminal.

* * * * *